United States Patent [19]

Kosarzecki

[11] 4,300,584

[45] Nov. 17, 1981

[54] HYDRAULIC SEQUENCE VALVE

[75] Inventor: Constantine Kosarzecki, Schaumburg, Ill.

[73] Assignee: Modular Controls Corporation, Villa Park, Ill.

[21] Appl. No.: 157,029

[22] Filed: Jun. 6, 1980

Related U.S. Application Data

[63] Continuation of Ser. No. 876,676, Feb. 10, 1978, abandoned.

[51] Int. Cl.³ ........................ F16K 31/12; F15B 11/15

[52] U.S. Cl. ........................ 137/106; 60/380; 137/624.14; 91/355; 91/356

[58] Field of Search .................. 137/102, 106, 624.14; 91/355, 356, 420, 421; 60/380

[56] References Cited

U.S. PATENT DOCUMENTS

| | | | |
|---|---|---|---|
| 3,665,810 | 5/1972 | Parrett | 137/102 |
| 3,799,032 | 3/1974 | Honeycutt | 137/493.6 X |
| 3,817,154 | 6/1974 | Martin | 91/420 |
| 3,955,478 | 5/1976 | Feucht | 92/85 B |

FOREIGN PATENT DOCUMENTS

| | | | |
|---|---|---|---|
| 208159 | 5/1957 | Australia | 91/356 |

*Primary Examiner*—William R. Cline

*Attorney, Agent, or Firm*—Trexler, Bushnell & Wolters, Ltd.

[57] ABSTRACT

A hydraulic sequencing valve is disclosed. A hollow spool is slidably carried in a valve body for motion between a first position in which fluid is caused to flow out a valve first port and a second position in which fluid is caused to flow into the first port. An annular partition is provided within the spool hollow, which divides the spool hollow into two chambers. When a pressure rise is experienced within the spool, a pre-set valve element trips, reducing pressure within one spool chamber. This pressure change shifts the spool to a second position. A check valve is provided in a separate valve body conduit. This check valve operates to assure that the valve spool remains in its second position until the valve and associated hydraulic system have completed the full cycle of operation.

5 Claims, 3 Drawing Figures

HYDRAULIC SEQUENCE VALVE

This is a continuation of application Ser. No. 876,676 filed Feb. 10, 1978 and now abandoned.

BACKGROUND OF THE INVENTION

This invention relates generally to hydraulic valves, and more particularly concerns a sequencing valve for use with reversible or cyclic hydraulic systems.

Many modern hydraulic circuits include elements which must be operated in a sequential or cyclic manner. For example, hydraulic circuits used in refuse compactors must operate so as to extend a ram and compact the refuse material; then, when the ram reaches the end of its stroke (or any obstruction), the hydraulic circuit must automatically operate so as to reverse the direction of ram travel and return the ram to its original or start position. In other machines and circuits, hydraulically powered motors must be operated to provide motion in a given direction, and thereafter must be operated in a reverse direction and return related machine elements to original or start positions. Machine operation must then be halted.

To provide the desired sequential control, hydraulic sequence valves have been offered. A line of such valves, which has met with great commercial success, are the positive sequencing valves offered by Modular Controls, Inc., Box. 38, Villa Park, Ill., 60181. For example, one such valve is designated as model PSV-1061-8T.

It is the general object of the present invention to provide an improved positive sequencing valve which will positively re-cock itself when the cycle of operation has been completed.

It is another object to provide a positive sequencing valve which will cause a controlled hydraulic element, such as a ram, to be operated first in one direction, and then in an opposite direction and, after the cycle of operation has been completed, which will return or re-cock itself so as to assure operation of the controlled element in the first direction once again when the hydraulic circuit is sequentially re-energized. A related object is to provide a valve mechanism within the valve which assures that this re-cocking action occurs rapidly so that the controlled element can be operated on a relatively continual basis if necessary.

Yet another object is to provide a valve of the type described which is inexpensive in its finished cost. A related object is to provide such a valve which is reliable in use and rugged in design. Another related object is to provide such a valve which will provide a long service life with minimal attention and maintenance.

Other objects and advantages of the invention will become apparent upon reading the following detailed description and upon reference to the drawings. Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included in the spirit and scope of the invention as defined by the appended claims.

Figure 1:
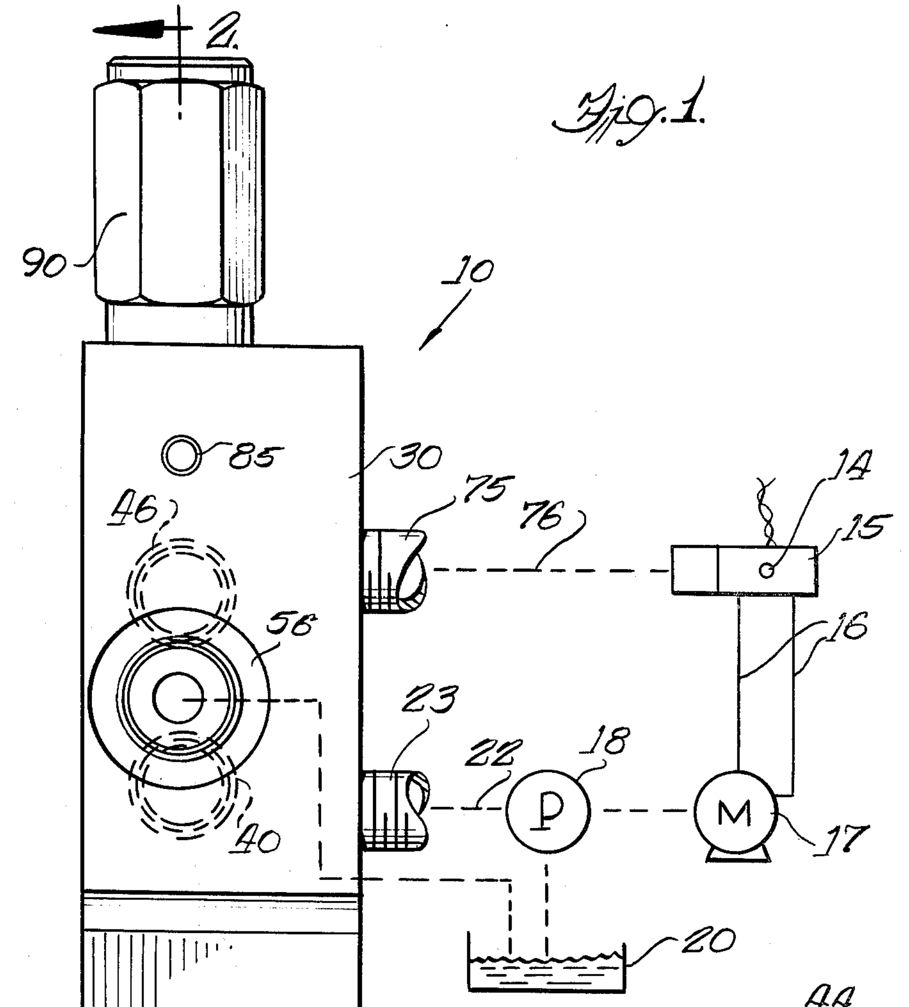
FIG. 1 is a side elevational view of a hydraulic valve embodying the present invention, showing the valve as it appears when used in a symbolically represented hydraulic circuit.
Figure 1:
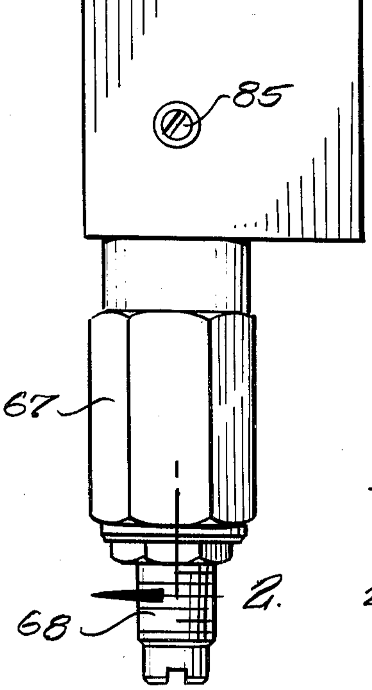
Figure 2:
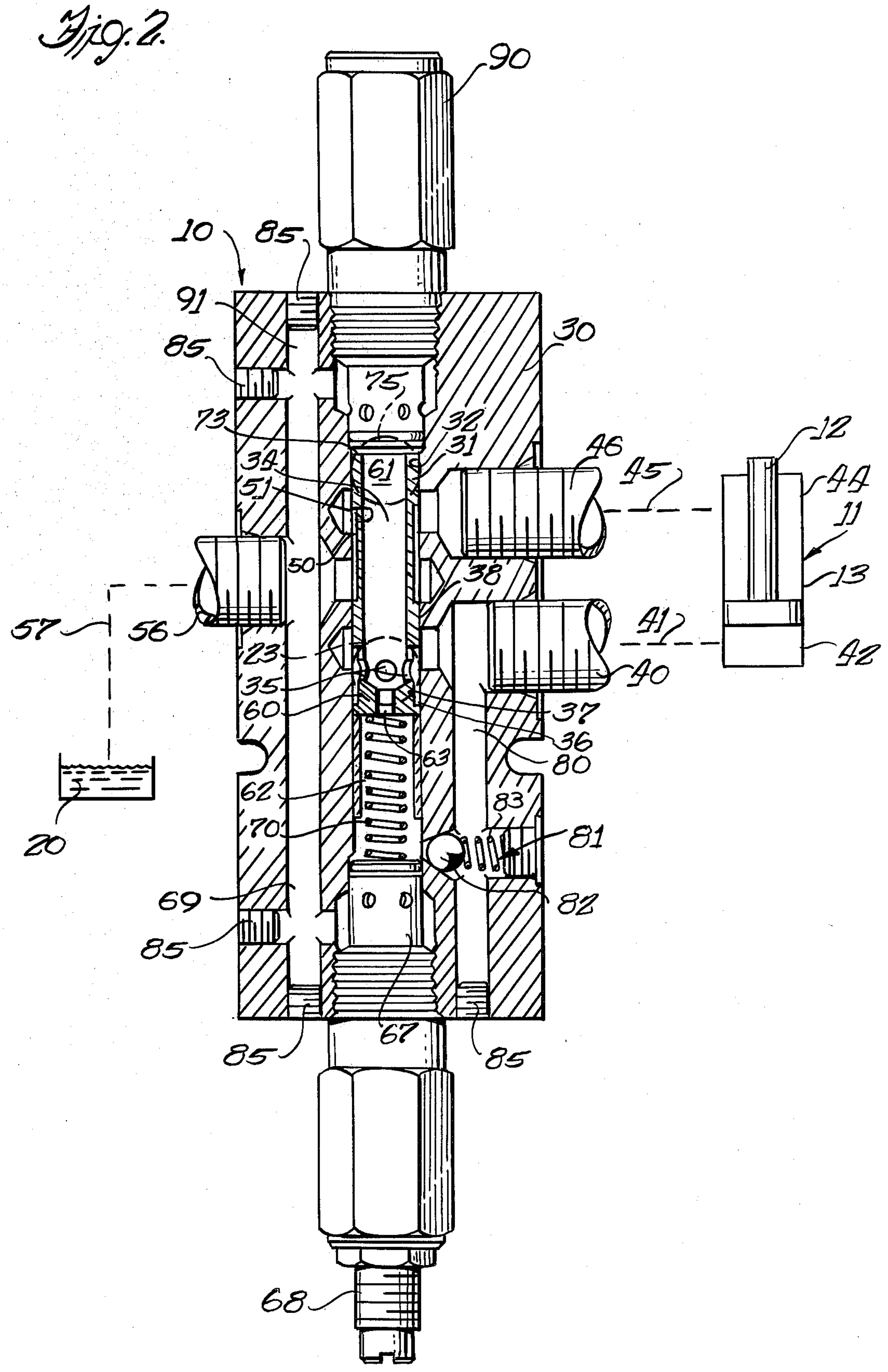
FIG. 2 is a sectional view taken substantially in the plane of line 2—2 in FIG. 1, and further symbolically showing portions of the hydraulic circuit.

Turning first to FIGS. 1 and 2, there is shown a valve 10 embodying the present invention as it appears when connected in a symbolically represented hydraulic circuit. Here the valve 10 is used to operate a hydraulic ram 11 so as to first extend a ram rod 12 from a ram cylinder 13 and then, after the rod 12 has been fully extended, the withdrawn the rod 12 back into the cylinder 13.

To start this sequence of operations, an electrohydraulic actuator switch 15 of known construction is provided. This switch 15 can be connected by wires 16 to a motor 17 of known construction which drives a hydraulic pump 18. When the start button 14 on the switch 15 is operated, the pump motor 17 is energized so as to drive the pump 18. The pump 18 draws fluid from a reservoir 20, to which fluid is also returned. In operation, the pressurized fluid is discharged by the pump 18 through a suitable line 22 to a valve pump port 23, shown directly in FIG. 1 and represented by a dotted circle in FIG. 2. The port 23 directs the fluid to a hollow spool 31 slidably disposed in a spool bore 32 centrally located in the valve body 30. As can be envisioned by particular inspection of FIG. 2, fluid can flow into a spool interior hollow area 34, then out a series of circumferentially arrayed openings 35, and into an annular space 36. This space 36 is defined by a recess 37 formed in the outer wall 38 of the spool 31, and by the central spool bore 32 itself. Since this space 36 is in fluid communication with a second line port 40, fluid flows out of the valve 10, along a suitable line 41, and into a head end chamber 42 of the ram 11. This positive, pressurized fluid flow causes the ram rod 12 to be extended from the ram cylinder 13.

Fluid collected in a rod end chamber 44 of the ram 11 is returned to the tank 20 through the valve 10. To this end, the fluid collected in the rod end chamber 44 flows along a suitable conduit 45 and into a first line port 46. It will be noted that an annular fluid flow space 50 is defined by an axially elongated recess 51 formed in the outer valve wall 38 of the spool 31, and by the spool bore 32 itself. When the spool 31 is in its illustrated first position, the axial location of this fluid passage 50 permits the fluid to flow into the valve through the first line port 46, through the valve, and thence out through a tank port 56. Fluid is returned to the tank 20 by an appropriate line 57.

Fluid will continue to flow in the described manner and the circuit and valve will continue to operate in the described way until the ram rod 12 has been fully extended from the ram 11 or until motion of the rod 12 is stopped by an obstruction or some other external condition. When ram extension has been completed, fluid pressure will begin to rise in the ram head chamber 42, and fluid pressure rises will be regressively but rapidly experienced along the line 41, at the second line port 40, and then within the spool 31.

It will be noted that the hollow spool 31 is provided with an annular partition 60 dividing the spool hollow 34 into an upper chamber 61 and a lower chamber 62. A fluid-flow-restricting orifice 63 is centrally provided in this partition 60. In accordance with the invention, the increase in fluid pressure is almost instantly transmitted through the orifice 63 into the second chamber 62 and to a sequencing valve element 67 which is in fluid communication with the second spool chamber 62. This sequencing valve element 67 can be adjusted by a screw 68 to open when it experiences a pre-selected pressure rise. When the valve element 67 opens, the fluid is permitted to exhaust from the second valve spool chamber 62 through a first conduit 69 leading from the sequencing valve element 67 to the tank port 56. Thus, when the pressure rise denoting completion of the ram-advance portion of the circuit operation is experienced in the second valve spool chamber 62, the sequencing valve element 67 opens. This valve opening action provides a constant pressure level within the second valve chamber 62.

Now, it will be noted that, although the pressure in the second valve spool chamber 62 has been maintained, the pressure is still rising in the first valve spool chamber 61. These circumstances cause the valve spool 31 to be forced from the first position relatively downwardly (as illustrated in FIG. 2) into a second position against the biasing effect of a coil spring 70. As soon as the spool 31 has shifted downwardly by a relatively small amount, the spool recess provides fluid communication between tank port 56 and a bore 80 communicating with the port 40. Under these circumstances, pressure in the bore 80 and behind a check valve 81 is reduced to the nominal pressure of the tank 20. The check valve 81 therefore opens (by unseating action of the ball 82). Fluid is thus permitting to flow out of the chamber 62, through the valve 81, up the communicating bore 80, and around the recess 51 to the tank port 56. Fluid is then returned to the tank 20 through the line 57. These conditions urge the spool 31 firmly into its second position, and retain the spool in that location.

As explained above, when the spool is in its second position, the fluid flow space 50 is drawn into a second position to provide fluid communication between the second line port 40 (as well as the bore 80) and the tank exhaust port 56. In this way, fluid present in the ram head chamber 42 is de-pressurized, and is exhausted to the tank 20. Fluid from the pump 18 and pump inlet port 23 continues to be directed through the spool openings 35 and into the first spool chamber 61. Since the upper end 73 of the spool has now been drawn downwardly, pressurized fluid within the first spool chamber 61 is directed out of the valve 10 through the first line port 46, and thence through the associated line 45 to the rod-end chamber 44 of the ram 11. Because fluid is now being directed into the rod-end chamber 44 and is being exhausted from the head end ram chamber 42, ram rod 12 withdrawing action occurs.

Again, these fluid flow paths and pressures will be experienced until the ram rod 12 has been fully retracted into the ram 11. A further or second pressure rise will then be experienced within the ram rod end chamber 44, and will be rapidly, regressively transmitted through the line 45, the associated line port 46, and into the spool first chamber 61. As can be envisioned, this chamber 61 is in fluid communication with a fluid pressure switch port 75. When this second pressure rise is transmitted through the pressure port 75 and associated line 76 to the switch 15 (see FIG. 1), switch mechanism (not shown) is actuated so as to de-energize the pump motor 17 and halt further pressurization of the ram 11.

In further accordance with the invention, the valve 10 then positively re-cocks itself to insure that fluid pressure will be delivered in the correct sequence to the ram 11 when further ram cyclic operation is desired. This is accomplished by the spring 70 which forces the spool 31 upwardly back into its first position. Compensating fluid flow occurs from the first spool chamber 61 through the orifice 63 to the second chamber 62.

In carrying out the invention, this valve can be manufactured at relatively low cost. To this end, the bores constituting the first conduit 69 and the second conduit 80 can be inexpensively formed by through-drilling, and the connecting passages can be formed by intersecting drilling operations. Inexpensive plugs 85 are then installed so as to secure these conduits and provide the desired passageways.

To guard against excessive pressure rise within the valve 10, a safety valve element 90 is provided. Should excessive pressure be experienced within the valve, as at the first valve chamber 61, the safety pressure release valve 90 opens, thereby permitting fluid pressure to be exhausted through the associated conduit 91 to the tank port 56.

To reduce constituent part inventory cost, the sequencing valve element 67 and the relief valve element 90 can be identically manufactured elements. That element which is used as the relief valve element 67 will, of course, be set by the adjustment screw 68 to trip or actuate at a considerably lower pressure than the trip pressure setting provided in the emergency relief valve element 90.

Figure 3:
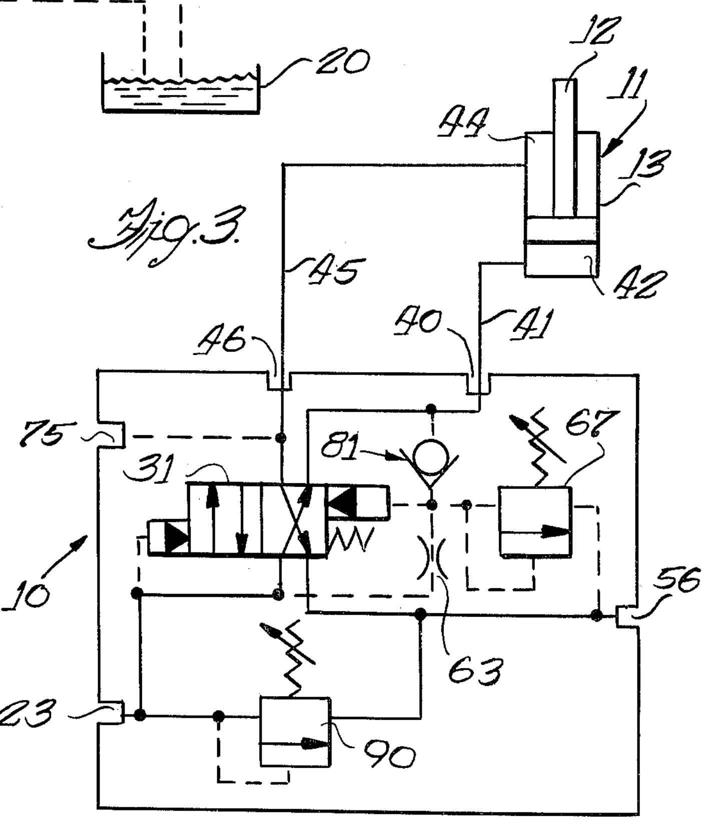
FIG. 3 is a symbolic circuit diagram of the valve shown in FIGS. 1 and 2.

The functional parts of the valve are symbolically represented in FIG. 3. When pressure is provided at the pump port 23, positive pressure is also provided at the second line port 40 so as to extend the ram rod 12. When the rod 12 has been fully extended or if rod 12 motion is otherwise obstructed, the retrogressively experienced pressure rise at the port 40 causes the valve to trip, thereby providing an exhaust path from the second line port 40 to the tank port 56. Simultaneously, positive pressure is redirected from the pump port 23 to the first line port 46 so as to positively withdraw the ram rod 12 into the ram 11. When the ram rod 12 has been fully withdrawn, yet another pressure increase, experienced at the pressure switch port 75, causes the pressure switch 15 (FIG. 1) to halt further pump operations.

The invention is claimed as follows:

1. A hydraulic sequencing valve comprising:

a valve body defining a tank port, a pump port, and first and second line ports;

a hollow spool slidable within the valve body between first and second positions;

an annular partition in the spool hollow dividing the spool hollow into first and second chambers, said partition defining a fluid flow restricting orifice providing fluid communication between the chambers, said spool defining within said valve body fluid flow paths from the pump port to the second line port and from the first line port to the tank port when in its first position, and fluid flow paths from the pump port to the first line port and from the second line port to the tank port when in its second position, the spool further defining at least one opening permitting fluid flow from the pump port into the first chamber;

biasing means for urging the spool into its first position and returning the spool from said second position to said first position in response to the termination of fluid flow from said pump port to the first chamber;

a valve element in fluid communication with said second chamber;

first conduit means defining a fluid path from the valve element to the tank port, said valve element being arranged to open responsive to a predetermined fluid pressure within said second chamber transmitted thereto from said first chamber through said spool orifice for creating a pressure differential between said chambers for causing said spool to move from said first position to said second position;

second conduit means defining a fluid path from said second chamber to said second line port and check valve means in said second conduit means arranged to open when said spool is in said second position for providing fluid communication between said second chamber and said tank port through said fluid path from the second line port to the tank port for maintaining said pressure differential between said chambers and arranged to close when said spool is in said first position to prevent fluid flow from the second line port back into said second chamber;

wherein said pump port is adapted to be coupled to a fluid pump associated with a pressure-sensitive switch for deactivating the pump upon sensing a predetermined pressure and wherein said valve body further defines a pressure switch port in communication with said first chamber and adapted to be coupled to said pressure-sensitive switch for transmitting fluid pressure within said first chamber to said switch for causing said switch to deactivate the pump for terminating the flow of fluid from said pump port to said first chamber in response to a preselected fluid pressure within said first spool chamber.

2. A hydraulic sequencing valve comprising:

a valve body defining a tank port, a pump port, and first and second line ports;

spool means slidable within the valve body between first and second positions and separating first and second chambers within the valve body, said spool means including fluid flow restricting orifice means providing fluid communication between the chambers, said spool means defining within said valve body fluid flow paths from the pump port to the second line port and from the first line port to the tank port when in its first position, and fluid flow paths from the pump port to the first line port and from the second line port to the tank port when in its second position, said spool means further defining at least one opening permitting fluid flow from the pump port into said first chamber;

biasing means for urging the spool means into its first position and returning the spool means from said second position in response to the termination of fluid flow from said pump port to the first chamber;

means including a valve element in fluid communication with said second chamber defining a fluid path from the second chamber to the tank port, said valve element being arranged to open responsive to a predetermined fluid pressure within said second chamber transmitted thereto from said first chamber through said orifice means for creating a pressure differential between said chambers for causing said spool to move from said first position to said second position;

check valve means between said second chamber and said second line port, said check valve means being arranged to open and provide fluid communication between said second chamber and said tank port through said fluid flow path from the second line port to the tank port when said spool reaches said second position for maintaining said pressure differential between said chambers for holding said spool in said second position and being arranged to close when said spool is in said first position for preventing fluid flow from the pump port back toward said second chamber;

wherein said pump port is adapted to be coupled to a fluid pump associated with a pressure-sensitive switch for deactivating the pump upon sensing a predetermined pressure and wherein said valve body further defines a pressure switch port in communication with said first chamber and adapted to be coupled to said pressure-sensitive switch for transmitting fluid pressure within said first chamber to said switch for causing said switch to deactivate the pump for terminating the flow of fluid from said pump port to said first chamber in response to a preselected fluid pressure within said first spool chamber.

3. A hydraulic sequencing valve according to claim 2 wherein the spool means includes an outer spool surface and said valve body includes a spool bore adjacent said outer spool surface and defining an annular spool recess therebetween, said recess defining fluid flow paths between the first line port and the tank port when the spool means is in its first position, and affording communication between the second line port and the tank port when the spool is in its second position.

4. A hydraulic sequencing valve according to claim 3 wherein check valve means releases for fluid flow from the second chamber through the spool recess to the tank port with the spool in its second position permitting return of the spool to its first position under influence of the biasing means.

5. A hydraulic sequencing valve according to claim 1 or 4 wherein the biasing means comprises coil spring means.

* * * * *